(12) United States Patent
Daniel et al.

(10) Patent No.: US 7,003,885 B2
(45) Date of Patent: Feb. 28, 2006

(54) WIRE NIPPER

(75) Inventors: Barton Wade Daniel, Kennesaw, GA (US); Glenn F. Ellison, Lubbock, TX (US); Scott G. Shepard, Lubbock, TX (US)

(73) Assignee: L&P Property Management Company, South Gate, CA (US)

( * ) Notice: Subject to any disclaimer, the term of this patent is extended or adjusted under 35 U.S.C. 154(b) by 18 days.

(21) Appl. No.: 10/351,840

(22) Filed: Jan. 27, 2003

(65) Prior Publication Data

US 2004/0143973 A1    Jul. 29, 2004

(51) Int. Cl.
    *B26B 17/00*    (2006.01)
(52) U.S. Cl. .......................................... 30/249; 30/250
(58) Field of Classification Search ................. 30/246, 30/155, 258, 134, 135, 273, 231, 249, 250, 30/251, 188, 189, 190
    See application file for complete search history.

(56) References Cited

U.S. PATENT DOCUMENTS

| | | | |
|---|---|---|---|
| 58,326 A * | 9/1866 | Waters ........................ 30/251 |
| 180,410 A | 8/1876 | Austin |
| 291,623 A | 1/1884 | Plumb |
| 391,859 A | 10/1888 | Reinert |
| 476,279 A * | 6/1892 | Levin .......................... 30/258 |
| 563,458 A | 7/1896 | Dillenbach |
| 639,469 A | 12/1899 | Trieschmann |
| 677,419 A | 7/1901 | Lott |
| 713,595 A | 11/1902 | Broman |
| 777,366 A | 12/1904 | Bergmark |
| 792,802 A | 6/1905 | Swan |
| 884,410 A | 4/1908 | Nicholson et al. |
| 915,491 A | 3/1909 | Shaw et al. |
| 936,574 A | 10/1909 | Searight |
| 938,831 A * | 11/1909 | Deane ......................... 30/244 |
| 942,043 A | 11/1909 | Searight |
| 1,046,852 A | 12/1912 | Prince |
| 1,088,429 A | 2/1914 | Kreseen |
| 1,210,128 A | 12/1916 | Woolf |
| 1,210,129 A | 12/1916 | Woolf |
| 1,333,578 A | 3/1920 | Ruppert |
| 1,378,791 A | 5/1921 | Johanson |
| 1,425,779 A | 8/1922 | Killin |
| 1,439,225 A | 12/1922 | Cashman |
| 1,476,049 A | 12/1923 | Bush |
| 1,622,446 A * | 3/1927 | Jourdan ....................... 30/246 |
| 1,791,608 A | 2/1931 | Wippel |
| 1,812,387 A * | 6/1931 | Upton ......................... 30/246 |
| 2,248,796 A | 7/1941 | Bosbikian et al. ........... 30/252 |
| 2,287,303 A | 6/1942 | Habart et al. ................ 30/252 |
| 2,292,271 A | 8/1942 | Heise .......................... 30/252 |
| 2,356,672 A | 8/1944 | Ivy ............................. 30/252 |
| 2,523,610 A | 9/1950 | Caddy ......................... 30/252 |
| 2,539,294 A | 1/1951 | Barnes ........................ 30/252 |
| 2,542,125 A | 2/1951 | Evans .......................... 30/252 |
| 2,546,073 A | 3/1951 | Kosik .......................... 30/252 |
| 2,558,697 A | 6/1951 | Vosbikian et al. ........... 30/266 |
| 2,744,323 A | 5/1956 | Kuhlman ..................... 30/251 |
| 2,803,058 A | 8/1957 | Mead .......................... 30/252 |

(Continued)

*Primary Examiner*—Stephen Choi
(74) *Attorney, Agent, or Firm*—Husch & Eppenberger LLC; Grant D. Kang

(57) ABSTRACT

A wire cutter having a handle, a fixed cutting blade mounted on the handle, a lever pivotally connected to the handle, and a stop on the lever for engagement with the fixed cutting blade is disclosed.

6 Claims, 2 Drawing Sheets

U.S. PATENT DOCUMENTS

| | | | |
|---|---|---|---|
| 2,834,107 A | 5/1958 | Brunnelle | 30/251 |
| 2,962,815 A | 12/1960 | Gundlach et al. | 30/251 |
| 2,975,518 A * | 3/1961 | Nelson | 30/250 |
| 3,090,121 A | 5/1963 | Chonka | 30/251 |
| 3,339,280 A | 9/1967 | Hall | 30/251 |
| 3,587,172 A * | 6/1971 | Link | 30/246 |
| 3,587,173 A | 6/1971 | Hexdall | 30/251 |
| 3,596,355 A | 8/1971 | Wertepny | 30/252 |
| 3,885,309 A | 5/1975 | Lund et al. | 30/250 |
| 5,241,752 A * | 9/1993 | Lutzke et al. | 30/249 |
| 5,566,453 A * | 10/1996 | Lin | 30/190 |
| 5,809,654 A * | 9/1998 | Huang | 30/134 |
| 6,681,492 B1 * | 1/2004 | Huang | 30/250 |
| 2002/0020067 A1 * | 2/2002 | Silver et al. | 30/226 |

* cited by examiner

WIRE NIPPER

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to cable and wire cutters and, more particularly, to a compression-type cable and wire cutter that can be controlled at a distance from a workpiece.

2. Related Art

Fibrous materials, such as cotton and nylon, are commonly formed into bales by simultaneous compression and binding. The bales are bound by wire, metal bands, plastic bands or other types of straps. After binding, the straps are under extreme tension such that merely cutting the strap will cause it to violently flail about. There is a continuing need in the wire cutting art for a device that allows a worker to cut the strap or wire at some distance from the cutting area.

U.S. Pat. No. 1,791,608 ('608) to Wippel illustrates a wire cutter having a bar, a plate pivoted to the bar, shearing means on the plate for severing a wire when rocked on its pivot, and a reversible handle member attached to the plate. However, operating the wire cutter disclosed by the '608 patent requires the operator to be close to the cutting area. Also, the '608 patent does not disclose a stop that prevents the handle from rotating too far.

U.S. Pat. No. 1,622,446 ('446) to Jourdan illustrates a wire cutter having two pivotally connected jaws, each jaw connected to a lever, an elongated bar connected to one of the levers, and a chain connected to the elongated bar. However, the wire cutter disclosed by the '446 patent is complex and difficult to operate.

There remains a need for a wire cutter having few components and simple operation that allows a worker to operate the wire cutter at a distance from the cutting area.

SUMMARY OF THE INVENTION

It is in view of the above problems that the present invention was developed. The invention is a wire cutter having a handle, a fixed cutting blade mounted on the handle, a lever pivotally connected to the handle, and a stop mounted on the lever for engagement with the fixed cutting blade. The wire cutter of the present invention may be operated at a distance from the cutting area.

Another aspect of the present invention is that the stop on the wire cutter limits the rotation of the handle.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figures 1A, 1B:
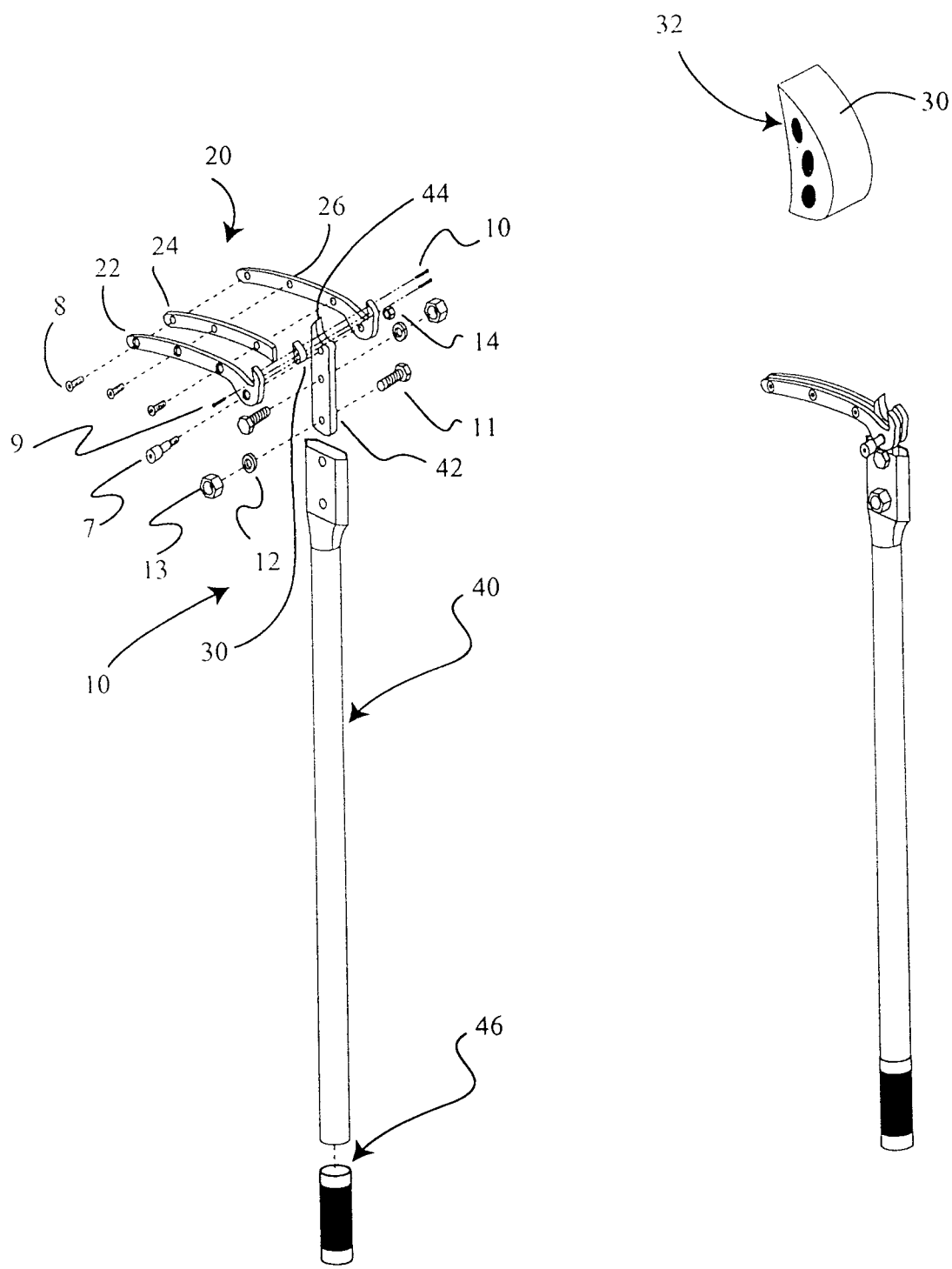
FIG. 1a illustrates an exploded view of a wire nipper.
FIG. 1b illustrates a perspective view of the wire nipper.

Referring to the accompanying drawings in which like reference numbers indicate like elements, FIGS. 1a and 1b illustrate a wire nipper 10, alternatively termed wire shear, wire cutter, or wire scissors, having a multiple-part lever 20. The lever 20 includes a first member 22, a spacer 24, and a second member 26. As seen in the drawings, the lever 20 is L-shaped with a hooked end and an arcuate portion extending from the hooked end. In some embodiments, the first member 22 and the second member 26 are dimensioned such that the spacer 24 is not required. The lever 20 preferably has an arcuate shape.

A stop 30 is operatively connected to the lever 20. In the preferred embodiment, the stop 30 is secured to the lever 20 through the use of spring pins and screws, however other means of attachment may be used. The stop 30 is located between first and second members 22, 24.

A handle 40 is pivotally connected at a proximate end to the lever 20. In the preferred embodiment, the handle 40 and the lever 20 are pivotally connected through the use of a bolt having a shank, but other pivot connections are equally usable. Attached to the proximate end of handle 40 is a fixed blade 42 having a cutting edge 44. A grip 46 is attached to the handle 40. In some embodiments, the handle 40 is tubular such that a portion of the fixed blade 42 fits within the tubular handle 40. Preferably, the cutting edge 44 is arcuate and a face 32 of the stop 30 is shaped such that it compliments the arcuate cutting edge 44.

Figure 2:
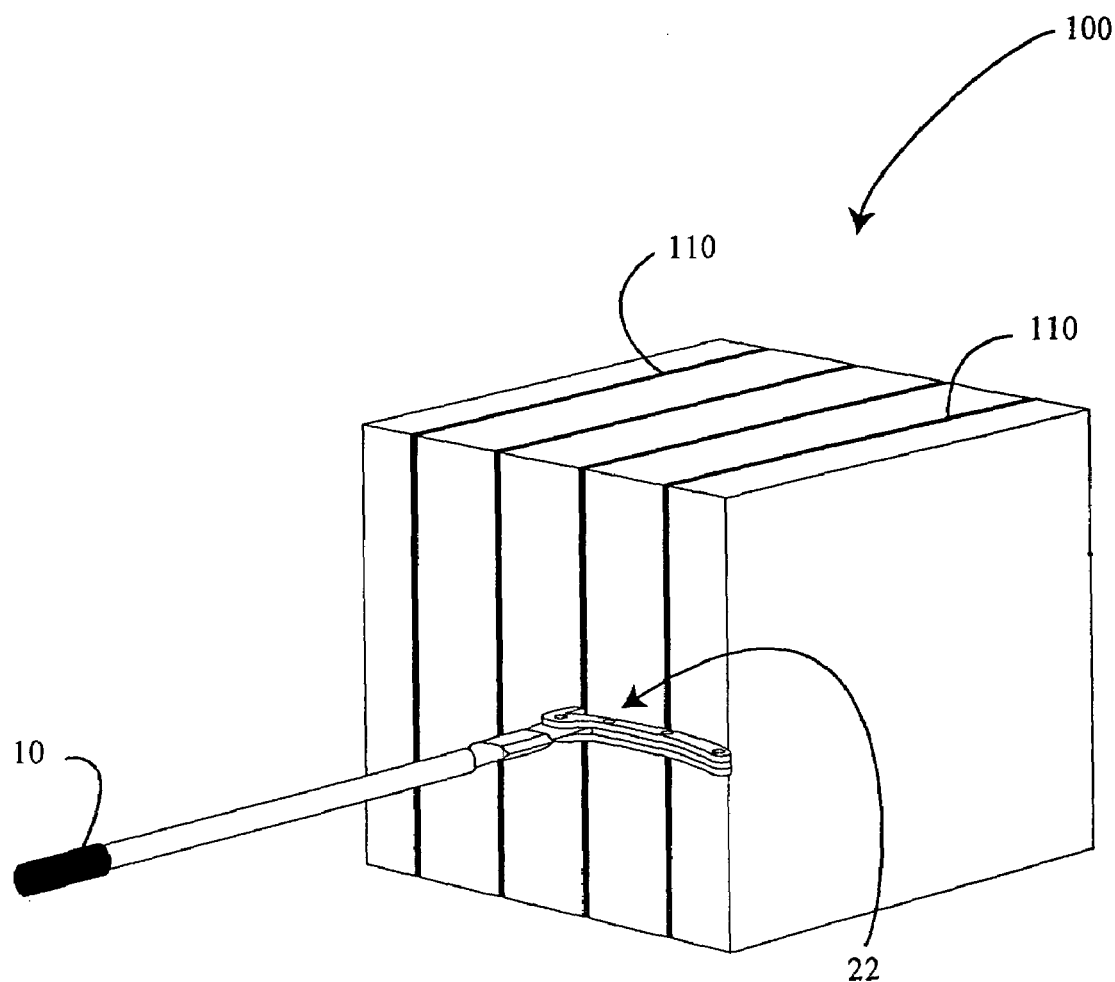
FIG. 2 illustrates a perspective view of a cotton bale.

Referring now to FIG. 2, in operation, the wire nipper 10 is placed in proximity to a cotton bale 100 having wires 110. A face 32 (as best seen in FIG. 1b) of the lever 20 is placed against the bale 100. The blade 42 is placed under one of the wires 110 with the cutting edge 44 directly in contact with the wire. A worker (not shown) pushes on the handle 40. The handle 40 is preferably elongated such that the worker (not shown) is at a significant distance away from said cutting edge 44. A significant distance is a length such that if the wire 110 were to suddenly snap and flail about that the worker would not be injured. Then the worker (not shown) pushes on the handle 40, thereby rotating the handle 40. Upon rotation of handle 40, the lever 20 exerts force against the bale 100. The lever 20 preferably has an arcuate shape such that it rocks against the bale 100. The worker (not shown) pushes on the handle 40 until the stop 30 contacts the wire opposite the cutting edge 44. The combination of the cutting edge 44 and the stop 30 cause the wire to be crushed and cut.

Because the baling wire 110 is under extreme tension, it will most likely break from the crushing action of the cutting edge 44 and the stop 30. The worker (not shown) continues to increase force on the handle until the wire 110 either breaks or is cut. When the wire 110 breaks or is cut, the cutting edge 44 engages the stop 30. To prevent premature wear of the cutting edge 44, the stop 30 is preferably a material hardness less than that of the cutting edge 44. The stop 30 also limits the rotation of the handle 40.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the lever 20 is illustrated as having multiple components while it could be made in one single element. Thus, the breadth and scope of the present invention should not be limited by any of the above-described exemplary embodiments, but should be defined only in accordance with the following claims appended hereto and their equivalents.

What is claimed is:

1. A wire nipper for use with a bale of fibrous material bound by at least one strap, the wire nipper comprising:

an L-shaped lever having a hooked end and an arcuate portion longitudinally extending from said hooked end, said L-shaped lever including a first member and a second member spaced apart from said first member;

a removable arcuate stop operatively connected to said hooked end of said L-shaped lever and located between said first and second members;

an elongated handle having a proximate and a distal end, said proximate end pivotally connected to said hooked end of said L-shaped lever; and a fixed blade operatively connected to said proximate end of said elongated handle, said fixed blade having a cutting edge, wherein said L-shaped lever is placed against the bale such that said cutting edge engages the at least one strap, whereby rotation of said handle engages said cutting edge with said removable arcuate stop to cut or break the at least one strap.

2. The apparatus of claim 1, wherein said L-shaped lever further comprises a spacer located between said first member and said second member.

3. The apparatus of claim 1, wherein a material hardness of said stop is less than a material hardness of said fixed blade.

4. The apparatus of claim 1, further comprising a grip operatively connected to said distal end of said handle.

5. The apparatus of claim 1, wherein said elongated handle is tubular.

6. The apparatus of claim 5, wherein a portion of said fixed blade is located within said tubular handle.

* * * * *